United States Patent Office 3,707,386
Patented Dec. 26, 1972

3,707,386
BONDING OR IMPREGNATING COMPOSITION
Fredrik Wilhelm Anton Kurz, Nysatravagen 12,
Lidingo, Sweden
No Drawing. Continuation-in-part of abandoned application Ser. No. 548,424, May 9, 1966. This application Apr. 28, 1970, Ser. No. 32,710
Claims priority, application Sweden, May 11, 1965, 6,157/65
Int. Cl. C09d 1/00
U.S. Cl. 106—84
8 Claims

ABSTRACT OF THE DISCLOSURE

The bonding action and moisture resistance of water-glass bonding compositions including silicon or metal silicides are improved by addition thereto about 1–35 parts by weight of oxidic metallic compounds to 100 parts by weight of water-glass. The additive metal compounds have a particle size below 100 microns, preferably less than 40 microns, and preferably have a smooth, dense surface.

---

This application is a continuation-in-part of application Ser. No. 548,424, filed May 9, 1966 and now abandoned.

It is known that sodium silicate (water-glass) is a strong, inorganic binding agent, but its use in this respect has heretofore been limited because of its poor resistance to moisture and to acid impurities in the air. The majority of water-glass bonds disintegrate in contact with water, even in moist atmospheres, and, furthermore, are subject to efflorescence, that is to say alkali salts form on the surface thereof. Another disadvantage is the tendency of the water-glass to migrate towards the surface in the bonded material, so that a hard crust is formed on the surface while the interior remains relatively soft. There are some water-glass-putty-combinations which are quite resistant to water, but these are only suitable for special purposes and not for general use.

The properties of water-glass bonding compositions may be modified to mitigate some of these deficiencies by:

(1) Dehydration
(2) Increasing the SiO$_2$ concentration, in particular as a stable SiO$_2$ gel.
(3) Chemical modification, e.g. by neutralizing the alkali or combining the alkali to metal silicates.

Dehydration may be achieved by heating and evaporation of water; this dehydration, however, is insufficient without additional measures. Another way of achieving dehydration is by treatment with carbon dioxide gas and heating, which results in evaporation of water in accordance with the formula:

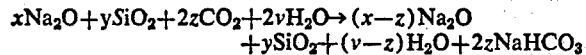

The sodium bicarbonate, however, is not resistant and absorbs moisture.

A further means of obtaining dehydration is by adding ferrosilicon (or metallic silicon or silicides) according to the formula:

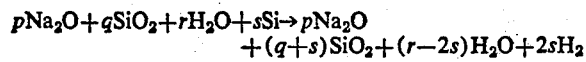

This means that an SiO$_2$ poor water-glass reacts with metallic silicon to form a water-glass which is richer in SiO$_2$. Already the fact that the water-glass becomes enriched in SiO$_2$ and dehydrated involves a decrease in water-solubility. This decrease would be more accentuated if it is possible to cause metal oxides to enter the glass phase. Without addition of metal oxides the Si treatment is not sufficient and also difficult on account of an uncontrollable and two vigorous evolution of gas.

An increase in the SiO$_2$ content is obtainable by removal of hydrogen by the addition of silicon powder, as noted above. Another means is addition of SiO$_2$ as minerals containing SiO$_2$. This is difficult, since these mineral powders are mostly inert. A further method consists in adding SiO$_2$ as a gel or sol. Only minor quantities, however, are taken up by the water-glass.

Chemical modification can be achieved by adding acids, alkali silicofluorides and some clays. It is also possible to form complex alkali metal silicates. It is known that insoluble multivalent metal oxides react with water-glass and form complex alkali metal silicates. The reaction is stronger at elevated temperatures. Best known is this connection is zinc oxide, which is the main component in most silicate paints. It is also known that the reaction to precipitate silicic acid and form alkali metal silicates must take place slowly, otherwise no glass phase is formed, but only incoherent crystalline silicates. Therefore, it is generally considered that substances which react rapidly, e.g. lime, gypsum, should not be admixed to water-glass.

Applicant has found, however, that a much better resistance to moisture is attained if the particle size of the added oxidic metal compounds is very small, e.g. below 100 microns, preferably below 40 microns, and have a special surface structure. The present invention, accordingly, relates to a moisture-and/or acidproof and flameproof bonding or impregnating composition comprising aqueous sodium or potassium silicate, with from 1 to 35% by weight of the sodium or potassium silicate of at least one metal compound having a particle size below 100 microns which precipitate SiO$_2$ from the sodium or potassium silicate to form silica gel and wherein the metal compound particles have a glassy or smooth sintered surface.

Further it has been found that a smooth, sintered surface of the particles increases the resistance to moisture. One cannot definitely explain the reason, but presumably a porous or spongy surface facilitates an immediate reaction with the water-glass with early precipitation of solid SiO$_2$ or SiO$_2$ complexes, while the glassy surface retards the reaction whereby the gel is formed only during the heating (or when self-hardening starts) of the mixture, when the mixture has been filled into molds or shaped in some other way, by which development the gel sets undisturbed without being torn or damaged during mixing of the components, because it is evident that a gel which is formed during mixing of sodium silicate and mineral powders has neither the same strength nor the same resistance to moisture in the dry state as does a gel produced only where the reaction is initiated during heating or at a later stage (later self-hardening) after completion of the mixing. (A proof is that reactions between sodium silicate and metal salts in solution, which make difficultly soluble gels, never can be used for building board, as the gel because of disaggregation during the mixing cannot be bonded to larger coherent units of some strength.) It has been proved that stronger bodies can be made by reactions between sodium silicate and oxidic metal compounds, which are difficult to dissolve or insoluble.

An example of such a material is perlite dust, a waste product formed in the expanding of perlite, and which, although a glassy silicate, may be considered as comprising 75% SiO$_2$, the balance being Al$_2$O$_3$ and several other metal oxides. The powder has a particle size of only a few microns and a very low bulk density of approximately 0.1. Materials having similar surface properties and reactive metal compound contents include finely divided slag (often also containing silicides) and finely ground particles of old furnace bricks (furnace linings), which have a high content of chromia and/or magnesia. Other examples are asbestos powder and kieselguhr, treated to have a smooth sintered surface.

Preferably 1 to 25% by weight of sodium silicate, of at least one metal oxidic compound in the form of powder, with the particle size below 100 microns and having a smooth sintered surface, is added to the sodium silicate to precipitate $SiO_2$ and form silica gel.

In addition, applicant has discovered that this effect is substantially enhanced by also including in the water-glass composition metal silicides in particle size of below 100 microns, preferably below 40 microns, whereby the $SiO_2$ content in the sodium silicate is increased and iron (from FeSi or $FeSi_2$), calcium (from CaSi), copper (from CuSi), etc. goes into solution and affords a still stronger silicate bonding. The change is not merely additive, but surprisingly great. X-ray diffraction shows that all the added Si is converted into $SiO_2$, evidently by forming insoluble alkali metal silicate compounds.

Contrary to the application of ferrosilicon in the absence of oxidic metal compounds for casting molds or ramming masses, a much smaller amount of metal silicides is needed for this invention. 2–10% in proportion to sodium silicate seems to be best, in any rarely exceeding 20%. The higher percentages of silicides are only needed if there is not occasion for heating, e.g. when making ramming masses or silicate cement, which have to be self-hardening. The new method of introducing both silicides and light reactive metal oxides instead of or at least partly for the usual heavy and inert sand, which does not participate in the reaction, results in lighter and better insulating ramming masses.

The importance of the addition of ferrosilicon, metal oxides and heating may be seen from the following comparison: Mixing 600 parts by weight of sand (700 cm.$^2$/g.) with 100 parts by weight of water-glass (48° Bé.), 6 parts by weight of perlite powder and 6 parts by weight of dicalcium silicate, test specimens having a compression strength of 25 kg./cm.$^2$ were obtained. By adding 10 parts by weight of ferro-silicon (40 microns), a value of 54 kg./cm.$^2$ was obtained. Addition of 6 parts by weight of ZnO (without FeSi) resulted in 80 kg./cm.$^2$, while addition of 6 parts by weight of ZnO and 10 parts by weight of FeSi (40 microns) increased the value to 135 kg./cm.$^2$. After heating to 175° C. the values were increased by about 100%.

Thus, it will be seen that the finer the particle size, the greater the mechanical strength and the chemical resistance. The last example, however, shows the presence of an interaction of several reaction mechanisms which cooperate to provide an optimum effect.

Although otherwise inert materials, such as sand, may be rendered reactive with water-glass by comminution to a very fine particle size, e.g. about 2000 cm.$^2$/g. in the case of sand, it was found that some very fine powders are not useful in spite of a suitable metal oxide content. The reason apparently is a too rapid reaction resulting in an incoherent unstable gel. Powders which provided the desired retardation and strengthening of the gel were found by microscopy to have a glassy surface. Examples are waste material from expansion of perlite of 1 micron particle size, some powdered slags and others. The retardation provided by such powders also has the advantage of inhibiting the tendency of the water-glass to migrate to the surface.

Another essential element of the bonding system of this invention is the reaction of water-glass and silicides, primarily metallic silicon and ferrosilicon, and the hydrogen evolution resulting therefrom. The following tests were made to ascertain the amount of hydrogen liberated when ferrosilicon is added to alkali hydroxide solutions. A mixture of 25 cc. of 10% aqueous KOH with 25 g. of 75% ferrosilicon forms at 50° C. after 15 minutes 24 ml. of gaseous hydrogen, after 30 minutes 370 ml. of hydrogen and after 33 minutes the reaction was so rigorous that it is no longer measurable. At 20° C. the reaction starts after 2 hours, but will soon be vehement. Adding 0.5 g. KOH in powdered form accelerates the reaction even at 20° C., so that approximately the same values as at 50° C. are obtained.

In practice it is not possible to make use of so rapid and uneven a reaction, which does not provide sufficient time for blending and application. Also, the evolution of hydrogen does not alone provide the desired final effect.

Taking water-glass instead of alkali hydroxide will result in a slower and smoother reaction, which forms alkali di- or trisilicates depending on the type of water-glass (48° Bé. or 38° Bé.). One or two hours will lapse before the evolution of gas starts, but it can be accelerated, if desired by adding a small amount of powdered alkali hydroxide.

While the retarded action as compared to alkali hydroxide is an advantage, the resulting alkali di- or trisilicate has no chemical resistance. The evolution of gas is still too vigorous and the alkalinity too high. However, by simultaneously adding fine mineral powders of glassy particle surface containing multivalent metal oxides, not only an additional retardation and thereby an even and controllable hydrogen evolution is obtained, but also an insoluble binding of the alkali. Complex insoluble alkali metal silicates are formed, which are resistant, in particular after heating to about 175° C. or higher. These metal oxides combine with water-glass to form alkali metal silicates even without addition of Si, but only to a limited extent. Due to the increase in $SiO_2$ content obtained by adding Si, greater amounts of these complex salts may be formed. X-ray diffraction shows that all Si from the ferrosilicon is converted into $SiO_2$. It is most surprising that this interaction of the various components, i.e. water-glass, ferro-silicon and metal oxide powder of special surface characteristics is not only additive, but synergistic, as appears from Exmaples 1 to 3.

The necessary addition of metal oxides is preferably made in the form of mineral powders containing such oxides. Multivalent metal salts result in the formation of insoluble metal silicates, in which the $SiO_2$ ions together with the metal ions form a very dense and stable reticular system. Monovalent metal salts are soluble in water. Alumina has particular characteristics, depending apparently at least in part in the small ion diameter of aluminium. In particular aluminum phosphate provides special advantages, since it is isomorphous with silicic acid. Adding active $Al_2O_3$ powder of high surface area together with a small amount of phosphoric acid results in a structure which prevents underlying components from passing and dissolving.

By adding ferrosilicon and heating it is possible to provide a chemical resistance such that the weight reduction (leaching) in water is totally avoided. This shows the importance of heating for the system. The reaction of alkali (water-glass) and ferrosilicon proceeds exothermally, but the heat is not sufficient to provide complete chemical resistance. For some products, such as foundry molds and cores, this is not necessary. Some additives may increase the exothermal production of heat and thereby provide a mechanically stronger final product. Apart from alkali hydroxide powder which may be added only exceptionally on account of low resistance to moisture, more exothermal heat is produced by adding 1.5–2% of

$Ca(OH)_2$ and 2–4% of sodium hexametaphosphate.

The addition of calcium hydroxide is of interest also because in this way it is possible to add CaO, which reacts to form resistant calcium silicate. Otherwise it is impossible to combine water-glass with calcium compounds at lower temperatures (below 700° C.) since the sodium silicate will immediately be decomposed and silicic acid precipitated. I have found, however, that it is possible to obtain calcium silicate even from water-glass, if special measures are taken. For example, it is possible to use insoluble calcium salts, such as calcium carbonate or calcium disilicate in very finely divided form, which also acts to inhibit the tendency of the water-glass lime combination of migrating toward the surface. Together with perlite powder, it is even possible to use slaked lime, which has hitherto been considered incompatible with water-glass. Amounts below 2% (based on the weight of water-glass) of $Ca(OH)_2$ provides a much improved effect as compared to 5% of calcium disilicate having a surface area of 3000 cm.²/g. This small addition acts, apparently because of the additional exothermal evolution of heat, as an initiator to start the reaction without accelerating it so much that disadvantages arise.

As regards the water-glass it is for economical reasons preferable to use sodium silicate, the cost of which is less than half the cost of potassium silicate. Aqueous sodium silicate (Na water-glass) of 48–50° Bé., ratio $Na_2O/SiO_2$ of 1:2.7 and 46% solids has better binding action than the usual commercial product of 38–40° Bé., ratio 1:3.3 and 36% solids, which has the advantage of higher $SiO_2$ content. Normally, it is not possible to combine the advantages of the two types, since mixing the two solutions provides a water-glass having an intermediate ratio. It is possible, however, to combine them by mixing ⅔–¾ of liquid water-glass of one type with ⅙–⅛ of the other type in powdered form, which results in about 20% higher strength. This is possible only by operating with some addition of water which affords possibility of dissolving the powder. Since the powdered sodium silicate reacts slower than the aqueous sodium silicate, a retardation is obtained, which also increases the strength of the strength of the mixture.

The unexpected effect of particle size is demonstrated in the following examples:

EXAMPLE 1

(a) The ingredients set forth below were mixed and testing specimens were molded therefrom.

| | Parts by weight |
|---|---|
| Silica sand (surface area 100 cm.²/g.) | 600 |
| Ferrosilicon (particle size >100 microns) | 10 |
| Perlite powder (part. size about 1 micron) | 6 |
| Dicalcium silicate (part. size about 1 micron) | 6 |
| Sodium silicate (48° Bé.) | 100 |

After hardening, the specimens were tested for compression strength, transverse strength and chemical resistance by standard testing methods. The results are indicated below:

Testing results

| | |
|---|---|
| Compression strength ___kg./cm.²__ | 20 |
| Transverse strength ___kg./cm.²__ | 9 |
| Chemical resistance (leaching with water) | None |

(b) In a similar test the same ingredients as in (a) were used, but ferrosilicon having a particle size of less than 40 microns was used. The same tests were made with the following results:

| | |
|---|---|
| Compression strength ___kg./cm.²__ | 54 |
| Transverse strength ___kg./cm.²__ | 19 |
| Chemical resistance ___percent__ | 30 |

(c) In a similar test the same ingredients as in (b) were used but sand of 700 cm.²/g. was used. The same tests were made with the following results:

| | |
|---|---|
| Compression strength ___kg./cm.²__ | 111 |
| Transverse strength ___kg./cm.²__ | 47 |
| Chemical resistance ___percent__ | 60 |

(d) In a similar test the same ingredients as in (b) were used, but the sand had a surface area of 2000 cm.²/g. The same tests were made with the following results:

| | |
|---|---|
| Compression strength ___kg./cm.²__ | 184 |
| Transverse strength ___kg./cm.²__ | 82 |
| Chemical resistance ___percent__ | 83 |

After heating to 200° C. the chemical resistance was 100%.

EXAMPLE 2

(a) A sand mold mixture of the type used for casting iron was prepared according to the following formula:

| | Parts by weight |
|---|---|
| Coarse foundry sand | 2000 |
| Sodium silicate (48° Bé.) | 120 |
| Water | 30 |
| Silicon metal powder (part. size 40 microns) | 50 |
| Perlite powder or kieselguhr (part. size 1 micron) | 10 |
| Calcium hydroxide | 1.8 |
| Kaolin | 6 |

Specimens molded from the mixture were tested for transverse strength at hourly intervals over three hours. The results were as follows:

TRANSVERSE STRENGTH

| After— | G./mm.² |
|---|---|
| 1 hour | 40 |
| 2 hours | 143 |
| 3 hours | 223 |

Using the same ingredients and proportions as in (a), but with silicon powder having a particle size of 1 micron, similar test pieces were prepared and tested for transverse strength. The results were as follows:

TRANSVERSE STRENGTH

| After— | G./mm.² |
|---|---|
| 1 hour | 420 |
| 2 hours | 450 |
| 3 hours | 460 |

EXAMPLE 3

To prepare light-weight boards of expanded perlite, the following composition was mixed and compacted to form boards which were heated to about 200° C.:

| | |
|---|---|
| Expanded perlite ___cc__ | 1500 |
| Ferrosilicon (part. size 100 microns) ___g__ | 30 |
| Perlite powder (1 micron) ___g__ | 15 |
| Dicalcium silicate ___g__ | 15 |
| Sodium silicate (48° Bé.) ___g__ | 300 |

The boards were tested for compressive strength, which was about 5 kg./cm.².

In a similar test using the same ingredients in the same proportions, the ferrosilicon, however, having a particle size of 1 micron, the compressive strength was 35 kg./cm.².

When the perlite powder was omitted in the last-mentioned composition, the value was about 12% lower, and the tendency of the water-glass to migrate to the surface was evident.

The increase of the $SiO_2$ content together with reduction of the water content and neutralizing of the alkali content are of great importance for a good result. These two effects are accomplished for the most part by the addition of reactive small particles with sintered surface and the conjoint action with silicides.

However, the increase of the $SiO_2$ content can be further improved by the following measures. Other variations include mixing dried silicate powder or finely ground glass powder, silica gel (colloidal silica), special cements (Al or Mg) or by addition of means for improving dispersion or reducing the viscosity such as sulfonates, lignosulfonates, surface-active agents, fatty alcohols etc. Some types of latex (e.g. styrene-butadiene copolymer) may be included to improve elasticity. The addition of alcohol also improves the properties of the composition. On the one hand alkyl silicate, e.g. ethyl silicate is formed, on the other hand the alcohol acts as a wetting agent on the small particles, improving the readiness for reactivity.

The neutralization of the alkalinity can be promoted by known measures, which however, in combination with the claimed addition of sintered small particles and silicides afford a much better effect. Thus, the addition of fluorides have a neutralizing effect, but sometimes makes the product weaker. This drawback is avoided by the present invention. Another known method, which can be combined, is addition of acidifying salts, esters, aluminum sulfate (alum), ammonium chloride, and ion-exchangers. Even addition of oxides of Al, Mg, Pb, Ti, Cr, Fe, Zn, Ba, Ca, etc. produce precipitation of insoluble compounds in the silicate mixes.

Generally, inorganic additions are preferred with regard to incumbustibility and flameproofing. Sometimes, it can be advantageous, however, to include organic additions in order to achieve a special hardening or bonding, e.g. furan resins, some phenolic resins, urea resin, starches, polyvinyl propionates, melamine resins, natural and synthetic rubber latex, for example butadiene-styrene latex.

The increase of the $SiO_2$ content is achieved partly by the self-hardening effect of the silicides, which can be increased by addition of polymers. If the exothermic reaction of the silicides is not sufficient, the reducing of water-content can be furthered by heating, for example, by drying in an oven or infra-red or flame-radiation, etc.

Resistance against humidity can be further increased by addition of bitumen, or wax-emulsions, silicones, or stearates, which either can be mixed in or sprayed unto the finished product.

In order to prevent shrinking of the finished product it is advantageous to take varying particle sizes of the fillers.

The mechanical strength can be increased by addition of glass, mineral or asbestos fibers, insertion of wires or similar reinforcements.

Sometimes it can be profitable, to get higher compression strength, to treat the mixed material in a heated press, etc.

It is also possible to make a porous product by adding foaming agents or gel pellets, the water of which is evaporated during drying, in this way forming closed cells. A similar effect is achieved by addition of super-light porous materials, such as expanded perlite, vermiculite, and cellular burned clay-beads (expanded clay).

Silicates of high or low silica or alkali content, i.e. sodium or potassium silicates or mixtures thereof may be used. Sometimes sodium or potassium hydroxide can be included. Even mixtures of ordinary (liquid) silicates and silicate powders with different ratio $SiO_2:Na_2O$ are sometimes advantageous, as the time for solution and application can be extended thereby and often a stronger bonding achieved.

The obtained produced can be used for many varying purposes, for which silicates have been proposed or applied as bonding or impregnating agent. As examples can be mentioned:

(a) as water- and/or acid-proof bonding means for light insulating board together with different aggregate materials such as expanded perlite, vermiculite, burned clay-beads, etc., but in some applications heavier aggregates such as sand, quartz powder or combinations of these may be used,
(b) roof- and floor insulation,
(c) flameproof intermediate or partition walls for factories, ships, etc.
(d) fireproof board, in which the silicate swells at high temperature of about 800–900° C. thereby improving the insulating property. As distinguished from similar known material, this board is resistant against humidity and does not need any protection by plastic foils or the like;
(e) spraying of fireproof or insulating coatings on other surfaces;
(f) impregnation means by mixing into or spraying on foam plastics, whereby they become hard and flameproof,
(g) impregnation means in order to make wood, wood fiber board, paper etc. flameproof,
(h) fire- and flame- or acid-proof mortars for various furnaces for lining or patching, particularly for the cellulose-industry,
(i) ramming masses,
(j) silicate cements,
(k) foundry molds.

The invention is particularly useful in the preparation of self-hardening foundry moulds, that is, foundry moulds which can be sufficiently hardened without heating or treatment with carbon dioxide gas. The silicon or silicide compound of the mixture reacts with the liberation of gaseous hydrogen and concomitant increase in the $SiO_2$ content, as is known, and the oxidic metal compound component, such as perlite, increases the bonding strength and also gives better edge definition in the molds. Besides the oxidic metallic compound or compounds the addition of lime, in proportions not exceeding about 2% weight based on the silicate solution, is highly desirable on account of the improvement in bonding action resulting therefrom, other substances which serve as dispersing aids, such as phosphates and amides may be included in small quantities, if desired.

In general, for foundry purposes, for each 100 parts molding sand, there are about 3.5 aqueous sodium silicate, and a total of about 1.2 parts of additives, that is, the silicon or silicides, oxidic metallic compounds, lime and the like.

In preparing water-glass bonding compositions according to the invention the additive agents (silicides and oxidic metal compounds) should be of particle size less than 100 microns preferably 40 microns or less. In general, from 1 to 25 parts by weight of oxidic metal compounds (other than lime) will be used per 100 parts sodium silicate while the silicide (metallic silicon may be regarded as a silicide since commercial forms always contain a small proportion of other metals, usually iron) may be added in proportions, by weight, of 1–34%. Preferably, the amount of silicon or silicide will be 1 to 10%, higher proportions normally being added when oxidic metal compounds are omitted or are present in proportions of less than 10% as, in general, the sum of the oxidic metal compound and the silicide additives should not exceed 35% by weight.

While ferrosilicon is preferred as the silicide additive calcium and copper silicide may be substituted.

The following examples illustrate several applications of the method but should not be construed as limitative.

EXAMPLE 4

Light insulating sheets with expanded perlite. First, all powdered ingredients are mixed, e.g. 6 liters of expanded perlite with 120 g. finely ground (particle size <100μ) ferrosilicon (75% or 90%), 100 g. perlite-powder (particle size <100μ), 50 g. zinc oxide to 1 kg. sodium silicate (ratio $SiO_2:Na_2O=2.9$) and some water. The mass is formed with some pressure either in a press or by rolling to sheets and heated to approximately 200° C. for about 1 hour. The ready board has a density of 0.2–0.35 depending on the composition and the pressure and does not lose any mechanic strength even after immersion in water for several months.

EXAMPLE 5

Instead of sodium silicate with a ratio of 2.9, the composition of Example 4 may be prepared with 3 quarters of the sodium silicate having a $SiO_2:Na_2O$ ratio=3.3 (38–40° Bé.) and 1 quarter in the form of a disilicate powder ($SiO_2:Na_2O$ ratio=2.04). 10 g. aluminum-sulfate can be mixed in for neutralizing, if desired.

EXAMPLE 6

Coating for wood fiber board. A mixture is made of 1 kg. sodium silicate (38–40° Bé.), 80 g. ferrosilicon (particle size <100μ) 80 g. perlite-powder (particle size <100μ) 20 g. asbestos powder, 80 g. melamine resin, 4 g. ammonium chloride and 170 g. water. This liquid is laid on the board, preferably during manufacture—in order to use the existing heat for drying—by rolling, spraying or sucking in. A coating of approximately ½ mm. is sufficient for making the board flameproof and moisture resistant.

EXAMPLE 7

A similar coating composition can be prepared, as in Example 6 but substituting 6 g. barium oxide or magnesium oxide and 40 grams of kieselguhr for the perlite powder, with the other ingredients and proportions unchanged. This mixture may be applied to the boards in the manner described in Example 6.

EXAMPLE 8

In producing silica cement, drying by heat usually cannot be applied, but radiation by flame or the like can possibly be arranged. Accordingly, it is useful to add means, which accelerate hardening; e.g. some hydrated lime and/or silica gel but together with slowly reactive means (with sintered surface) for obtaining good mechanical strength. A suitable composition is, for example: 6 parts of weight of sand to 1 part of weight of sodium silicate (e.g. 38–40° Bé.) and (in percentage of the weight of silicate) 10% ferrosilicon (particle size <100μ) 5% chromium magnesite (having a smooth sintered surface and particle size <100μ) ½% hydrated lime, 1% silica gel, 3% ZnO and some water is added.

EXAMPLE 9

1 to 1.2 parts of a powder containing 60 parts by weight of powdered metallic silicon, 4 parts by weight of perlite dust, 6 parts by weight of kaolin, 1.8 parts by weight of hydrated lime, 3 parts by weight of sodium hexametaphosphate and 2 parts by weight of dicyandiamide are mixed with 3 to 4 parts by weight of aqueous sodium silicate and this mixture is then mixed as a binder with 100 parts by weight of foundry sand. This composition is suitable for preparing foundry molds.

EXAMPLE 10

Superior molds and cores for metal casting in commercial foundries were prepared from the following formulations (all parts by weight):

(A)

| | |
|---|---|
| Foundry sand | 2000 |
| Water glass 48/50° Bé. | 70 |
| Water | 15 |
| Metallic silicon (or ferrosilicon) <100μ | 25 |
| Perlite powder <100μ | 5 |
| Ca(OH)$_2$ | 1 |
| Kaolin | 3 |

(B)

| | |
|---|---|
| Foundry sand | 2000 |
| Water glass 40/50 Bé. | 75 |
| Water | 20 |
| Metallic silicon (or ferrosilicon) | 25 |
| Ca(OH)$_2$ | 1 |
| Kieselguhr | 7 |
| Kaolin | 4 |
| Na hexametaphosphate | 2 |
| Dicyandiamide | 1 |
| NaOH (powder) | 3 |

Test specimens prepared from these formulations A and B hardened and developed maximum strength in about three hours.

EXAMPLE 11

Another composition particularly adapted for coating of mineral fiber boards is prepared by mixing 1 kg. sodium silicate (about 50° Bé.), 40 g. silicon metal powder (<100μ), 20 g. asbestos powder and 6 g. titanium dioxide powder (<100μ). The inclusion of the titanium dioxide improves resistance of the coating to attack by acidic substances.

The perlite powder used in the above experiments had a smooth (amorphous) surface, and was composed of about 74% SiO$_2$, 14% Al$_2$O$_3$ and minor contents of other metal oxides.

Although in the foregoing examples the composition includes such inorganic material as sand and expanded perlite in substantial proportions, it should be understood that the same are the materials to be bonded by the composition of this invention and they are inert so far as the improved adhesive action is concerned and that where a bonding agent alone is desired, as for example, in producing laminated articles, the composition normally would not include such inert components.

Thus, in its simplest form, a suitable adhesive composition embodying the invention would include water-glass, a metal oxide in an amount of up to about 25% by weight based on the water-glass, and a silicide in an amount such that, when added to the amount of the metal oxide, the total amount of these materials does not exceed 35% by weight, based on the water-glass, the particle size of the oxide and silicide components being less than 100 microns, and preferably less than 40 microns.

It is emphasized that the essential feature of the invention involves a triple reaction between (a) water-glass, (b) mineral powder containing metal oxides and having specific surface characteristics (large surface area and glassy surface structure) and (c) silicides.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A bonding and impregnating composition comprising about 100 parts by weight of water-glass base intimately admixed with (a) 1–35 parts by weight of a finely divided material from the group consisting of silicon, ferrosilicon, copper silicide, calcium silicide and mixtures thereof with (b) a finely-divided oxidic metallic compound wherein the amount of said oxidic compound is from 1 to 25 parts by weight, said admixed materials having a particle size below 100 microns and a smooth surface.

2. A bonding and impregnating composition as set forth in claim 1 wherein metal in the oxidic metallic compound is selected from the group consisting of MgO, Al$_2$O$_3$, Cr$_2$O$_3$, TiO$_2$, ZnO, PbO, FeO and BaO.

3. A composition as set forth in claim 1, which also contains a small amount of calcium hydroxide.

4. The method for producing a bonding and impregnating composition which comprises intimately mixing dry ingredients comprising from 1 to 34 parts by weight (a) of a powdered metal from the group consisting of silicon, ferrosilicon, copper silicide and calcium silicide with from 1 to 25 parts by weight (b) of a powdered oxidic compound of a metal from the group consisting of magnesium, aluminum, titanium, zinc and barium, said components (a) and (b) having a particle size less than 100 microns and with a smooth surface, said mixture of (a) and (b) not exceeding 35 parts by weight, and then adding this mixture of dry ingredients to 100 parts by weight of water-glass and mixing therewith to produce a smooth dispersion.

5. The method of claim 4 wherein the metal (a) is ferrosilicon.

6. The method of claim 4 wherein the water-glass mixture of ⅔–¾ of a liquid alkali silicate and ⅙–⅛ of solid alkali silicate, one of said silicates having an alkali metal oxide to silica ratio of about 1:2.7 and the other having a ratio of about 1:3.3.

7. A composition as set forth in claim 1 wherein the composition includes a member of the group consisting of silica gel, finely divided silica and finely divided silicates of high $SiO_2$ content.

8. The method of claim 4 wherein the oxidic compound (b) is perlite dust.

References Cited
UNITED STATES PATENTS

| | | | |
|---|---|---|---|
| 2,708,168 | 5/1955 | Zachariason | 106—84 |
| 3,416,939 | 12/1968 | Schutt et al. | 106—84 |
| 3,218,683 | 11/1965 | Nishiyama et al. | 106—84 |

JAMES E. POER, Primary Examiner